US007702772B2

(12) United States Patent
Kurup et al.

(10) Patent No.: US 7,702,772 B2
(45) Date of Patent: Apr. 20, 2010

(54) DISCOVERING AND DETERMINING CHARACTERISTICS OF NETWORK PROXIES

(75) Inventors: Madhu M. Kurup, Sunnyvale, CA (US); Pradeep Kamath, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 498 days.

(21) Appl. No.: 11/678,030

(22) Filed: Feb. 22, 2007

(65) Prior Publication Data

US 2008/0209028 A1 Aug. 28, 2008

(51) Int. Cl.
*G06F 15/173* (2006.01)
(52) U.S. Cl. .................. 709/223; 709/224; 709/225; 709/238
(58) Field of Classification Search .............. 709/204, 709/205, 238, 239
See application file for complete search history.

(56) References Cited

U.S. PATENT DOCUMENTS

| 7,346,922 B2 * | 3/2008 | Miliefsky ............... 726/3 |
| 7,383,574 B2 * | 6/2008 | Burrows et al. ............ 726/13 |
| 2003/0212779 A1 * | 11/2003 | Boyter et al. ............. 709/223 |
| 2006/0221865 A1 * | 10/2006 | Hawbaker et al. ......... 370/255 |
| 2007/0177524 A1 * | 8/2007 | Qian et al. .............. 370/252 |

OTHER PUBLICATIONS

"AiS Alive Proxy List: High Anonymity Proxies," aliveproxy.com, 1 page, http://www.aliveproxy.com/high-anonymityproxy-list/ (accessed Jul. 2, 2008).

"Free HTTP Proxy List: the list of free HTTP(S) proxies," freeproxy.com, 30 pages, http://www.freeproxy.ru/download/lists/goodproxy.txt (accessed Jul. 2, 2008).

"Fresh Anonymous Proxy List," digitalcybersoft.com, 3 pages, http://www.digitalcybersoft.com/ProxyList/fresh-proxylist.shtml (accessed Jul. 2, 2008).

"Port Scanner," Wikipedia, the free encyclopedia, 6 pages, http://en.wikipedia.org/wiki/Port_scanner (accessed Jul. 2, 2008).

"Nmap," Wikipedia, the free encyclopedia, 5 pages, http://en.wikipedia.org/wiki/Nmap (accessed Jul. 2, 2008).

(Continued)

*Primary Examiner*—Wing F Chan
*Assistant Examiner*—Razu A Miah
(74) *Attorney, Agent, or Firm*—Darby & Darby P.C.; Jamie L. Wiegand

(57) ABSTRACT

A device, system, and method are directed towards determining network information. A network address is determined for a possible proxy. A determination is made whether a port on the possible proxy is open and/or if the port supports an HyperText Transfer Protocol (HTTP) proxy request. A request is sent to the possible proxy over the port, the request being configured to be forwarded to a network device. A type of the possible proxy is determined based in part on a behavior of the network device. The behavior may indicate whether the request is received by the network device, or whether the possible proxy obscures an origin of the request. The proxy type may include whether the possible proxy is a non-proxy, an anonymous-proxy, a controlled-proxy, and/or an open-proxy. Various types of network analysis may then be performed using the possible proxy and the determined proxy type.

18 Claims, 5 Drawing Sheets

OTHER PUBLICATIONS

"Wget," Wikipedia, the free encyclopedia, 7 pages, http://en.wikipedia.org/wiki/Wget (accessed Jul. 2, 2008).

"Socks," Wikipedia, the free encyclopedia, 5 pages, http://en.wikipedia.org/wiki/SOCKS (accessed Jul. 2, 2008).

"Proxy Server," Wikipedia, the free encyclopedia, 6 pages, http://en.wikipedia.org/wiki/HTTP_proxy (accessed Jul. 2, 2008).

* cited by examiner

DISCOVERING AND DETERMINING CHARACTERISTICS OF NETWORK PROXIES

TECHNICAL FIELD

The present invention relates generally to networking and, more particularly, but not exclusively to discovering and determining characteristics of a possible proxy devices.

BACKGROUND

The use of the Internet has become very important for commerce, and other daily tasks. An important component of the Internet are proxy devices, which are used to route information from one network device on the Internet to another network device. Typically, a proxy device is a computing device, router, or the like, that is configured to operate as a relay between two communication devices on a network.

Proxy devices may have varying behaviors. Some proxy devices may simply forward a request and/or response message between the network devices without modifying the forwarded messages, while others may modify the messages before forwarding them. Some proxy devices may provide the identity of the requestors, while others may hide or obscure the identities or activities of users of these devices. Typically, this information hiding is carried out to prevent detection of fraudulent or otherwise malicious requestors. For example, spammers may use these devices to hide the origin of their attacks.

Identifying the quality and kind of network traffic coming from a proxy device may be helpful to, among other things, distinguish legitimate network traffic from non-legitimate network traffic. Currently, lists of proxy devices are published on the Internet. However, many proxy list generation mechanisms rely on volunteered lists of IP address that could be scanned by a variety of products. Moreover, many lists are manually entered, and they may not be up to date or accurate. Further, the addresses on the lists often depend on specific ports and/or IP addresses. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
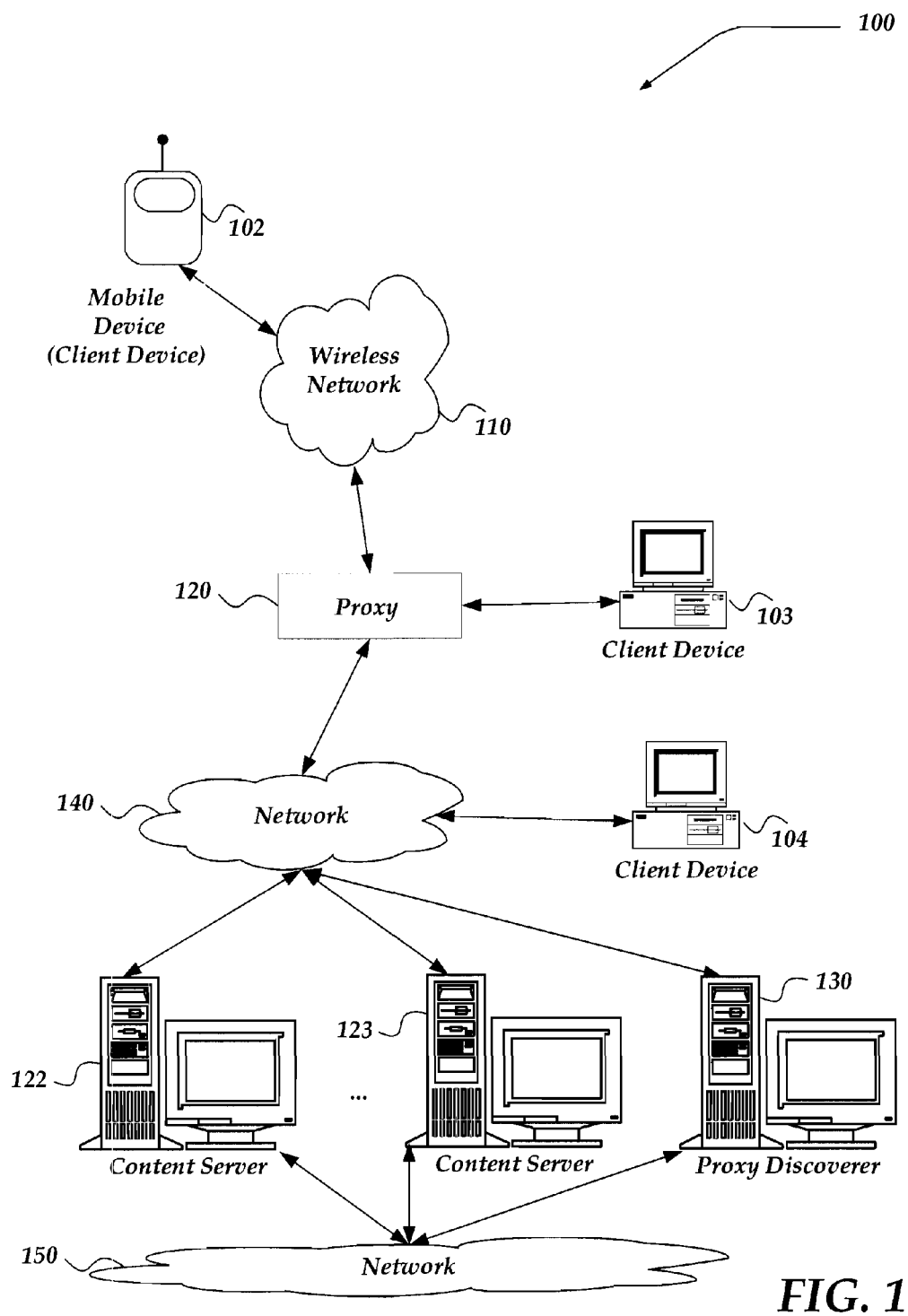
FIG. 1 shows components of an environment in which one or more embodiments of the invention may be practiced.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "requester" refers to any network device for originating a request for information over a network.

The terms "proxy" or "proxy device" refers to any program, device, or component for forwarding a request on behalf of a requester and/or for forwarding a response to the requestor. The request may be serviced internally or by passing the request on, with possible translation, to a server.

The term "HTTP proxy" refers to a proxy device configured to forward HyperText Transfer Protocol (HTTP) requests between network devices. HTTP and HTTP proxy devices are described in more detail in Request For Comments (RFC) 2616 available from the Internet Engineering Task Force (IETF), which is incorporated herein by reference. As described in RFC 2616, an HTTP request may include, among other things, a Uniform Resource Identifier (URI) and/or a Uniform Resource Locator (URL).

There are many types of proxy devices. For example, some proxy devices may be anonymous-proxy devices, opened proxy devices, and/or closed proxy devices. An anonymous-proxy device is a device that obscures or otherwise obfuscates at least some information in a network message that is forwarded or otherwise managed by the proxy device. An open-proxy device is a device that forwards messages between devices without restrictions on the source of the messages. In contrast, a closed-proxy device is a device that forwards requests and/or replies between device based on, among other things, the identity of the device sending the messages. A closed-proxy device may filter messages based on, for example, a particular class of requests, a particular network port of access, an Internet Protocol (IP) address of the requester, a user identifier (ID) of the requestor, or the like. One of ordinary skill in the art will recognize that there may be other degrees of security, obfuscation, and/or control that may be applied to network traffic associated with a proxy device. Therefore, proxy devices may also perform a variety of other actions, besides the examples identified above. Such variations in actions and types of proxy devices may also be included in various embodiments of the invention.

A degree of trust in a quality and kind of network traffic from a proxy device may depend on the type of the proxy device. For example, network traffic from a closed-proxy device may be considered to be more legitimate and/or may have less variability because it is limited to a closed set of users, devices, or the like. Network traffic from an open-proxy device may be considered to be more suspect because, for example, any user, or devices, such as spammers could use the open-proxy device. However, this may not always be the case, and the invention is not constrained by such considerations.

Briefly stated the various embodiments are directed towards determining a type of proxy device that a network device may be, based in part on a behavior of the network device. A network address is determined for a possible proxy. A determination is made whether a port on the possible proxy is open and/or if the port supports an HTTP proxy request. A request is sent to the possible proxy over the port, the request being configured to be forwarded by the possible proxy to a network device. A type of the possible proxy is determined based in part on a behavior of the network device. The behavior may indicate whether the request is received by the network device, or whether the possible proxy obscures an origin of the request. The proxy type may include whether the possible proxy is a non-proxy, an anonymous-proxy, a controlled-proxy, and/or an open-proxy. Various types of network analysis may then be performed using the possible proxy and the determined proxy type. For example, the network analysis may include determining a network traffic pattern for network traffic from the possible proxy. The network traffic pattern may include a route for the network traffic, for example, to a geographic location of the possible proxy, a fraud or abuse usage pattern, or the like. Network traffic from the possible proxy may also be controlled based on the network analysis and/or the determined proxy type.

Illustrative Operating Environment

FIG. 1 shows components of an environment in which one or more embodiments of the invention may be practiced. Not all the components may be required to practice the invention, and variations in the arrangement and type of the components may be made without departing from the spirit or scope of the invention. As shown, system 100 of FIG. 1 includes networks 110, 140, and 150, proxy 120, content servers 122-123, mobile device (client device) 102, client device 103-104, and proxy discoverer 130.

Mobile device 102 may include virtually any portable computing device capable of receiving and sending a message over a network, such as network 110 or the like. Mobile device 102 may also be described generally as client devices that are configured to be portable. Thus, mobile device 102 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile device 102 typically ranges widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Linguage (WML), WMLScript, JavaScript, Standard Generalized Markup Language (SMGL), HyperText Markup Language (HTML), eXtensible Markup Language (XML), and the like, to display and send a message.

Mobile device 102 also may include at least one other client application that is configured to receive content from another computing device. The client application may include a capability to provide and receive textual content, media content, and the like. The client application may further provide information that identifies itself, including as type, capability, name, and the like. In one embodiment, mobile device 102 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a message, or the like, sent to content server 122-123, proxy discoverer 130, client devices 103-104, proxy 120, or other computing devices.

Mobile device 102 may be configured to receive content from content servers 122-123 over networks 140 and 100. Mobile device 102 may further be configured to include a client application that enables the end-user to log into an end-user account that may be managed by another computing device, such as from one of content servers 122-123. Such end-user account, for example, may be configured to enable the end-user to receive entails, send/receive IM messages, SMS messages, access selected web pages, or the like.

Client devices 103-104 may include virtually any computing device capable of communicating over a network to send and receive information, or the like. The set of such devices may include devices that typically connect using a wired or wireless communications medium such as personal computers, multiprocessor systems, microprocessor-based or programmable consumer electronics, network PCs, or the like. In one embodiment, client devices 103-104 may be configured to access a website, or other location, of shared content, and to annotate the content, add additional content, or the like. Similar to mobile device 102, client devices 103-104 may be configured to receive content from content servers 122-123 over network 140 and/or through proxy 120.

Proxy 120 may include virtually any computing device capable of forwarding messages between network devices. Proxy 120 may be an open-proxy, a closed-proxy, an anonymous-proxy, or the like. In one embodiment, proxy 120 may obscure at least some of the information forwarded between the network devices. In one embodiment, proxy 120 may be configured to forward network traffic of particular types (e.g., of particular protocols), on particular ports, or the like. As shown, proxy 120 may forward network traffic between content servers 122-123, proxy discoverer 130, and/or client devices 102-104.

Network 110 is configured to couple mobile device 102 and proxy 120. Network 110 is enabled to employ any form of computer readable media for communicating information from one electronic device to another.

Network 110 may also include any of a variety of wireless sub-networks that may further overlay stand-alone ad-hoc networks, and the like, to provide an infrastructure-oriented connection for mobile device 102. Such sub-networks may include mesh networks, Wireless LAN (WLAN) networks, cellular networks, and the like.

Network 110 may include an autonomous system of terminals, gateways, routers, and the like connected by wireless radio links, and the like. These connectors may be configured to move freely and randomly and organize themselves arbitrarily.

Network 110 may employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile device 102 with various degrees of mobility. For example, network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), or the like. In essence, network 110 may include virtually any wireless communication mechanism by which information may travel between mobile device 102 and another computing device, network, or the like.

Network 140 is configured to couple content servers 122-123 and proxy discoverer 130 and their components with other computing devices, including, client device 104 and/or proxy 120. As shown, client device 103 is coupled directly to proxy 120 (e.g., on an Intranet), and may not be coupled to network 140. However, the invention is not so limited, and another network, similar to network 140 may also be interposed between proxy 120 and client device 103. Network 140 is enabled to employ any form of computer readable media for communicating information from one electronic device to another.

Network 140 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 140 includes any communication mechanism by which information may travel between proxy 120, client device 104, content servers 122-123, and/or proxy discoverer 130, or other computing devices.

Additionally, communication media typically embodies computer-readable instructions, data structures, program modules, or other data and/or other transport mechanisms and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Network 150 is a network configured to couple content server 122-123 and/or proxy discoverer 130. In one embodiment, network 150 may be configured operate substantially similarly to network 140. Network 150 may operate as an Intranet to provide secure communication between the components coupled on network 150.

Content Servers 122-123 may include virtually any computing device capable of communicating over a network to send and receive information, or the like. Content servers 122-123 may provide, for example, web content, web pages, HTTP content, XML content, email content or the like. Content servers 122-123 may provide content to at least one of client devices 102-104 over network 140, network 110 and/or through proxy 120. Content servers 122-123 may create access logs of network traffic accessing content servers 122-123, or may otherwise provide monitoring of the network traffic. In one embodiment, content servers 122-123 may provide the access logs (or other monitoring service) to proxy discover 130 over network 150.

One embodiment of proxy discoverer 130 is described in more detail below in conjunction with FIG. 3. Briefly, however, proxy discoverer 130 may include any computing, device capable of connecting to a network to enable determination of a characteristic of a possible proxy on the network. Proxy discoverer 130 may be configured to analyze network traffic between proxy 120 (a possible proxy) and (one of) content servers 122-123 to determine whether proxy 120 is a possible proxy.

Proxy 120 may be a device that is unmanaged by proxy discoverer 130, or otherwise provides limited access, control or management to proxy discoverer 130. For example, proxy 120 may be managed by a company, entity, person, different than the one managing proxy discoverer 130. Proxy 120 may be configured to block requests configured to change the behavior of proxy 120, requests to change the type of proxy 120, requests for information about proxy 120, login requests, or the like.

In any case, proxy discoverer 130 may discover an open port on proxy 120. Proxy discoverer 130 may also forward a message such as an HTTP request message through proxy 120 to content servers 122-123. Proxy discoverer 130 may examine the network traffic received by content servers 122-123 to determine whether the forwarded request message is received by content servers 122-123. Based on the network behavior of proxy 120 and/or content servers 122-123, proxy discoverer 130 may determine the proxy type of proxy 120. Proxy discoverer 130 may also perform network analysis on proxy 120 to, among other things, determine if access from proxy 120 should be restricted, or the like. Proxy discoverer 130 may, based on the network analysis and/or determined proxy type, control network traffic from the possible proxy and/or protect a network device (e.g., a network device on network 150, content servers 122-123) from the network traffic. Proxy discoverer 130 may employ a process similar to that described below in conjunction with FIGS. 4-5 to perform at least some of its actions.

Although FIG. 1 illustrates proxy discoverer 130 as a single computing device, the invention is not so limited. For example, one or more functions of proxy discoverer 130 may be distributed across one or more distinct computing devices. For example, determining a network address to a possible proxy, determining a type of the possible proxy, performing network analysis using the possible proxy, or the like, may be performed by a plurality of computing devices, without departing from the scope or spirit of the present invention. Moreover, content servers 122-123 may also reside within proxy discoverer 130, or proxy discoverer may reside within one of content servers 122-123.

Figure 2:
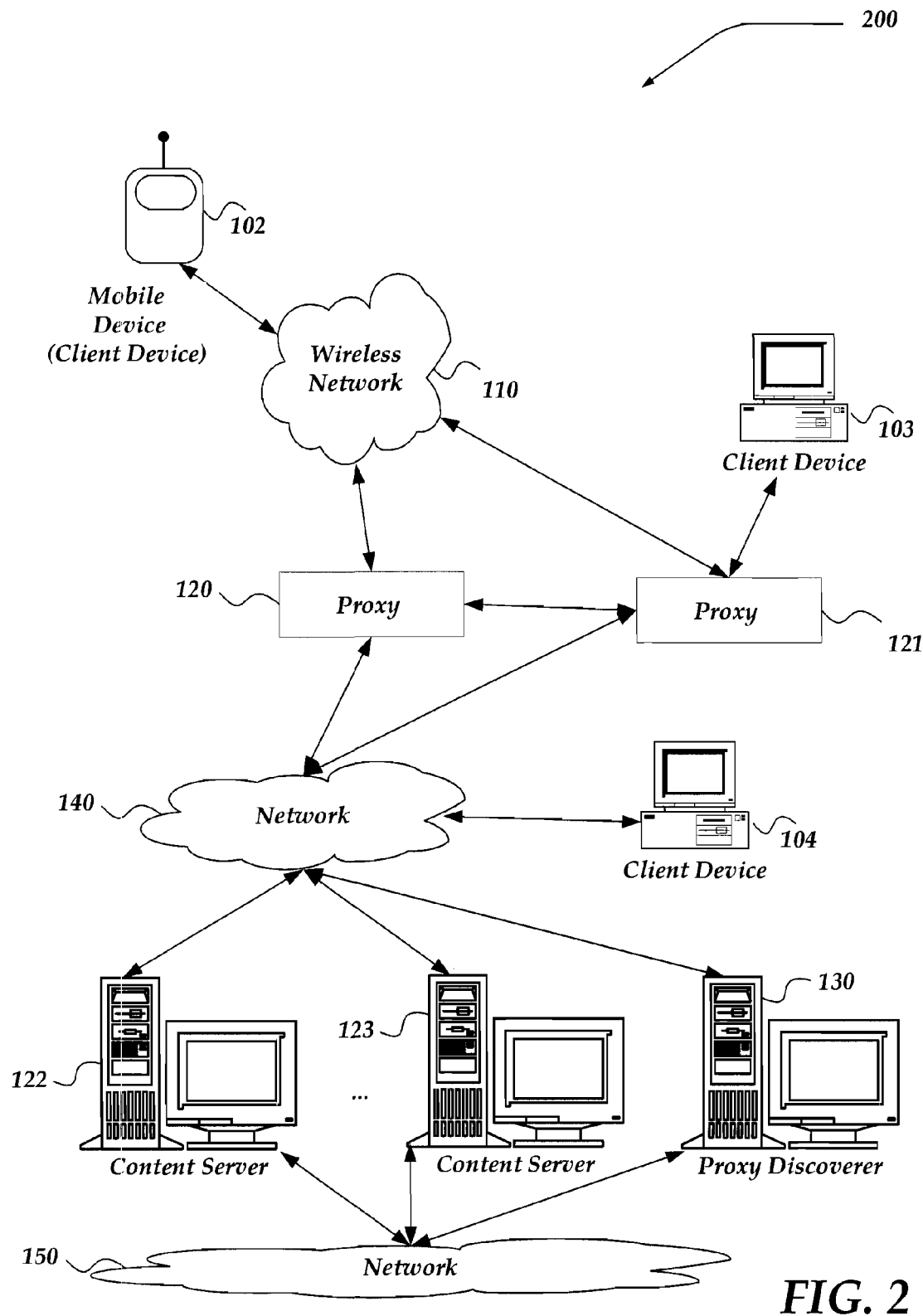
FIG. 2 shows components of another environment in which one or more embodiments of the invention may be practiced.

FIG. 2 shows components of an environment in which one or more alternate embodiments of the invention may be practiced. FIG. 2 includes substantially the same components as FIG. 1. For example, system 200 of FIG. 2 includes networks 110, 140, and 150, proxy 120, content servers 122-123, mobile device (client device) 102, client device 103-104, and proxy discoverer 130. However, unlike system 100, system 200 also includes proxy 121. As shown, proxy 121 is in communication with wireless network 110, proxy 120, and network 140. Unlike in system 100, in system 200, client device 103 is in communication with proxy 121.

In this example, proxy 121 may be any device for forwarding information over a network. Proxy 121 may be configured, for example, to be a controlled-proxy. That is, proxy 121 may restrict the forwarding of messages over the network to network devices associated with particular users, IP addresses, or the like. For example, proxy 121 may be configured to forward messages from proxy 120 and/or client device 103, but not from other devices in system 200.

Proxy discoverer 130 may determine that proxy 120 is an open and anonymous proxy server. Moreover, proxy discoverer 130 may determine that proxy 121 may have open ports, but may not be forwarding requests/messages from proxy discoverer 130 to content servers 122-123. Proxy discoverer 130 may use proxy 120 to send a message through proxies 120 and 121 and to (one of) content servers 122-123. If the message is received by content servers 122-123, then proxy discoverer 130 may determine that proxy 121 is a controlled-proxy. If the message has obscured the origin of the request, then proxy discoverer 130 may determine that proxy 121 is also an anonymous server. Proxy discoverer 130 may employ a process similar to that described below in conjunction with FIGS. 4-5 to perform at least some of these actions.

Illustrative Server Environment

Figure 3:
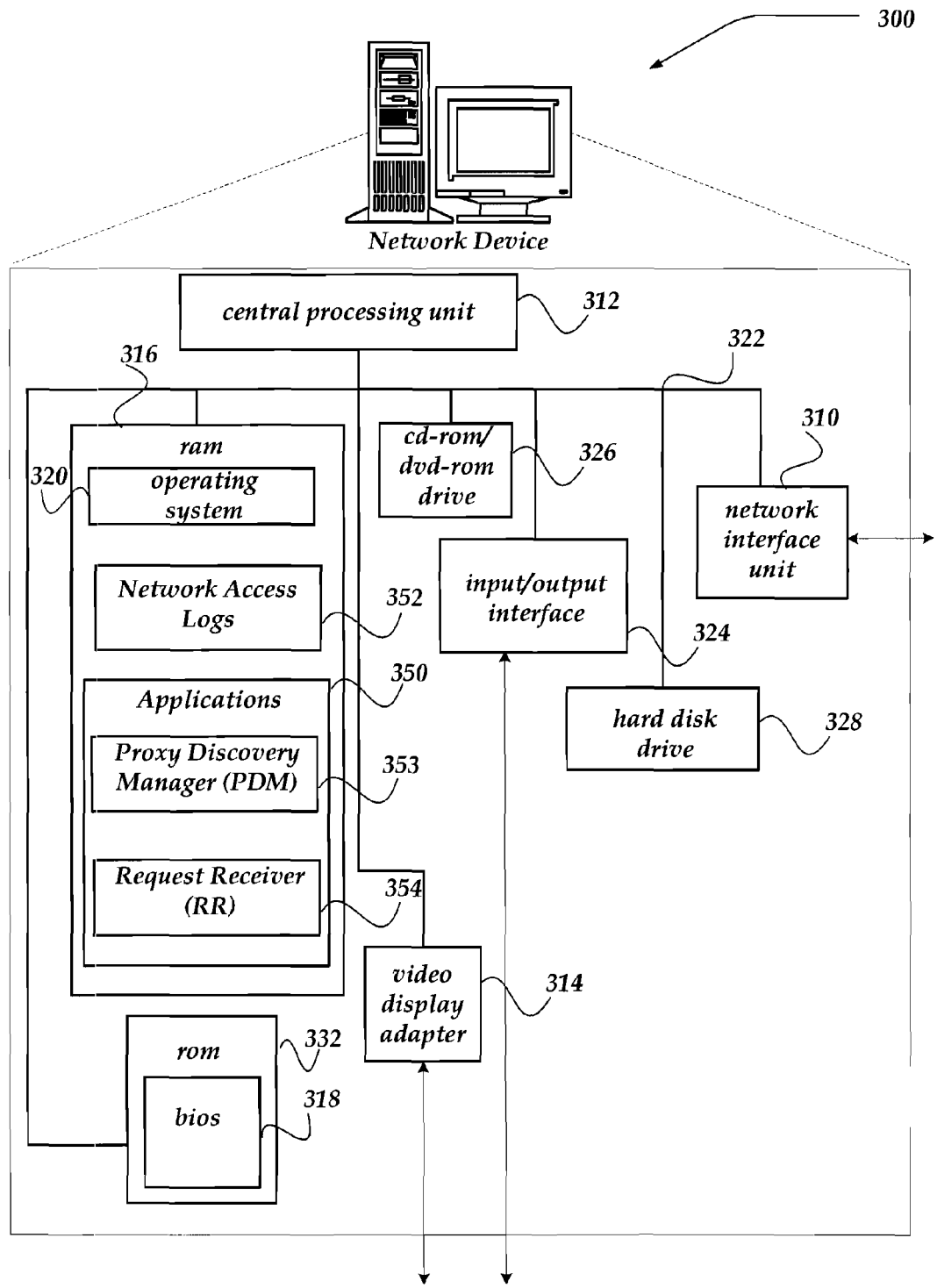
FIG. 3 shows one embodiment of a network device, according to one embodiment of the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, proxy discoverer 130 and/or content servers 122-123 of FIGS. 1 and 2.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. In one embodiment, the operating system may be FreeBSD, or another UNIX operating system. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, including XmlHTTFRequest (XHR), Asynchronous JavaScript and XML (AJAX), JavaScript Object Notation (JSON) programs, customizable user interface programs, IPSec applications, encryption programs, security programs, account management, and so forth.

Network access logs 352 stores a network traffic access to servers, such as, for example, content servers 122-123. Network access logs 352 may be an HTTP log, for example. Network access logs 352 may be a database, a file, or any type of datastore. In one embodiment, network access logs 352 may be in the World Wide Web Consortium (W3C) log file format, but may be in any other format without departing from the scope of the invention. A server program, such as an HTTP server, and FTP server, an email server, or the like may provide the entries in network access logs 352. For example, an HTTP server on content servers 122-123 may provide the entries to network access logs 352, over network interface 310, for example.

Request Receiver (RR) 354 is any component configured to receive a request over network interface 310. RR 354 may be an application program, such as HTTP, Simple Mail Transfer Protocol (SMTP), FTP program, or the like. In one embodiment, RR 354 may be configured to simply monitor requests (e.g., to receive a request, but to provide no responses). RR 354 may be configured to receive requests over a network address, such as a network address associated with network device 300. RR 354 may be configured to provide entries about requests, attempted requests, responses, provided to or from RR 354, or the like, to network access logs 352 for further processing and storage.

Proxy discovery manager (PDM) 353 is configured to identify a possible proxy, determine the type of the possible proxy, analyze network traffic associated with the possible proxy and/or to control network traffic associated with the possible proxy based on network analysis and/or the determined type. PDM 353 may analyze information from network access logs 352 to identify a network address to a network device that is a possible proxy based on, for example, a fraud usage pattern, or the like. PDM 353 may scan a port on the possible proxy using network interface 310 and/or operating system 320. PDM 353 may send a request over network 310 through the possible proxy, wherein the request is directed to be sent to a network address associated with RR 354 (e.g., the network address of network device 300). RR 354 may alert PDM 353 that the request is received. For example, RR 354 may invoke an application program interface (API) within PDM 353, may send an alert message to PDM 353, may store information indicating the request has been received in network access logs 352, or the like. In an alternate embodiment, network access logs 352 may alert PDM 353 that the request has been received. PDM 353 may begin a timer after sending the request. After the expiration of the timer, PDM 353 may determine that the request has not been received (e.g., RR 354 has failed to receive the request through the possible proxy on a particular port). Operations of PDM 353 are described in more details in conjunction with FIGS. 4-5.

Generalized Operation

Figure 4:
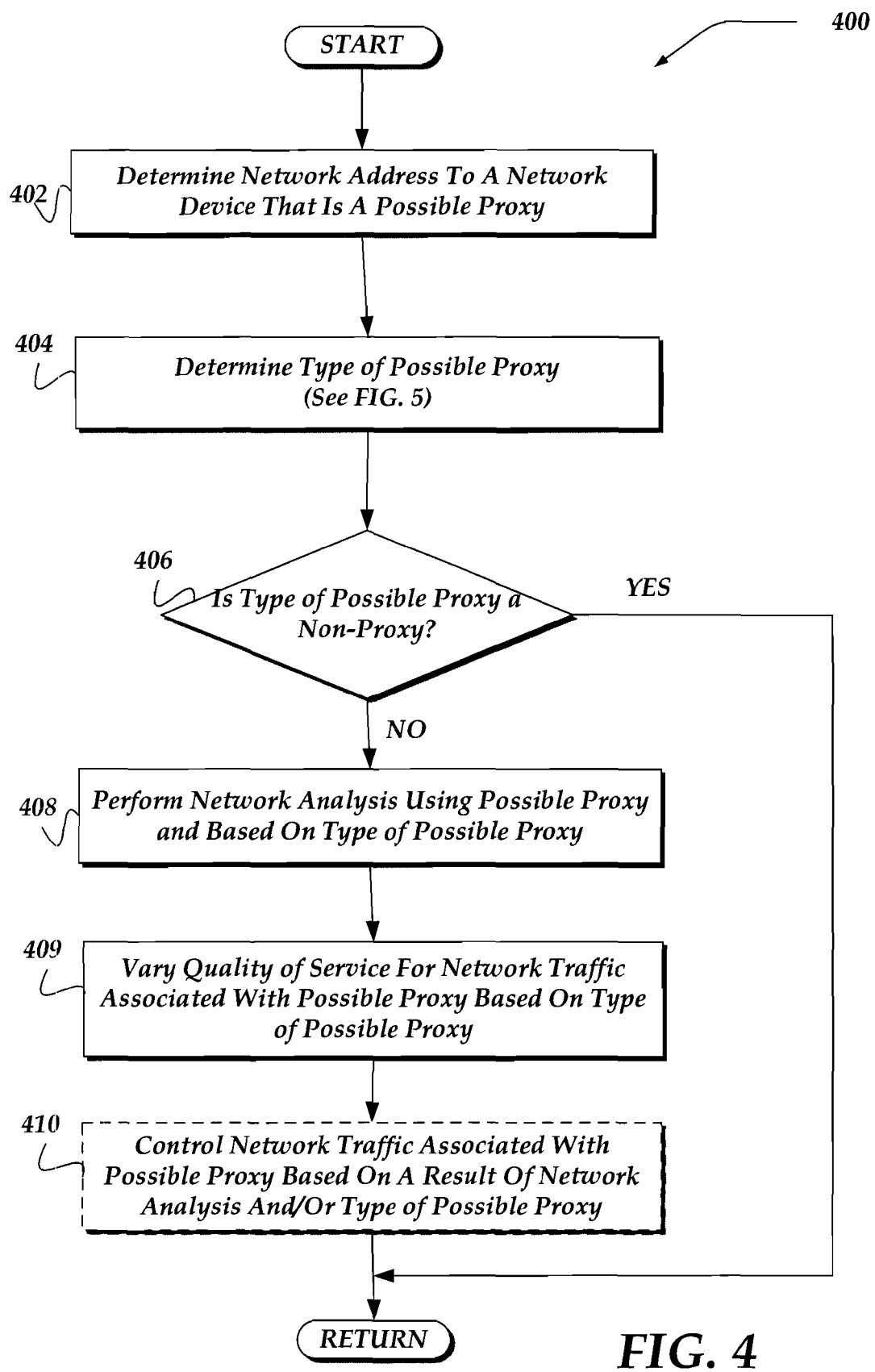
FIG. 4 illustrates a logical flow diagram generally showing one embodiment of a process for determining a characteristic of a possible proxy for use in analyzing network traffic from the possible proxy.

The operation of certain aspects of the invention will now be described with respect to FIGS. 4-5. FIG. 4 illustrates a logical flow diagram generally showing one embodiment of a process for determining a characteristic of a possible proxy for use in managing network traffic from the possible proxy. Process 400 may be performed by proxy discoverer 130 and content server 122-123 of FIGS. 1 and 2.

Process 400 begins, after a start block, at block 402, where a network address to network device that is a possible proxy is determined. In one embodiment, the network address may be provided based on a network traffic history. For example, HTTP server logs, File Transfer Protocol (FTP) logs, or another list of network activity from the network address may be recorded. For example, in one embodiment, the network address is determined as a possible proxy based on whether the network traffic history of the network address matches a network traffic pattern. One network traffic pattern may be that a particular device repeatedly sends the same request in a short period of time, the particular device repeatedly sends a request to upload a series of content (e.g., music from a repository), the particular device repeatedly sends login requests, the particular device repeatedly performs password guessing, or the like. Processing next continues to block 404.

At block 404, a type of the possible proxy is determined. The type may identify a characteristic of the possible proxy, such as a possible behavior of the possible proxy, to, for example, obscure the origin of a request, or the like. In one embodiment, the type may include at least one of, a non-proxy, a controlled-proxy, an anonymous-proxy, an open-proxy, or the like. At least some of the types are mutually exclusive. For example, typically, a possible proxy cannot be both a non-proxy and a proxy. In another example, a possible proxy is not both a controlled-proxy and an open-proxy. However, a possible proxy may be more than one of at least some of the types. For example, the type of possible proxy may be both a controlled-proxy and an anonymous-proxy, or an open-proxy and an anonymous-proxy.

Figure 5:
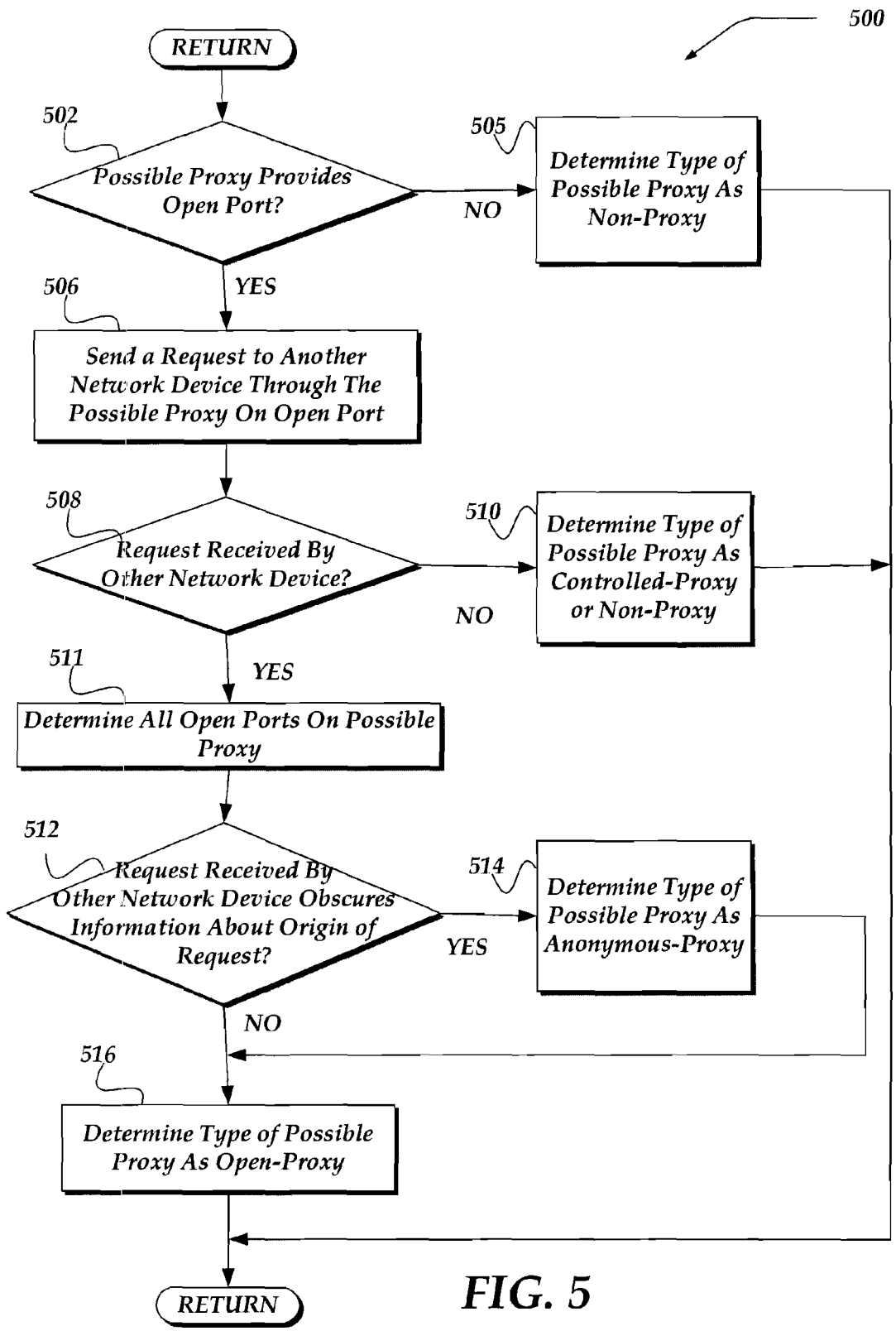
FIG. 5 illustrates a logical flow diagram generally showing one embodiment of a process for determining a type of a possible proxy.

Operations for performing block 404 are described in more detail in FIG. 5. Briefly, however, at block 404, the type of the possible proxy may be determined based on a port provided by the possible proxy and/or a network behavior of the possible proxy. The port may be determined to be open, or otherwise available (e.g., to receive or accept an HTTP proxy operation/request). The network behavior may include whether the possible proxy successfully forwards a request from one network device or another, whether the possible proxy modifies the request and/or a characteristic of the request forwarded by the possible proxy over the port. In any case, processing continues to decision block 406.

At decision block 406, it is determined whether the type of the possible proxy is a non-proxy. A non-proxy may indicate that the possible proxy is not enabled to perform a proxy operation (e.g., from a particular requester). If the type of the possible proxy is determined as a non-proxy, then processing returns to a calling process for further processing. In another embodiment, the type of the possible proxy as a non-proxy may also be provided to another process for further processing. If the type of the possible proxy is not determined to be a non-proxy, then processing continues to block 408.

At block 408, a network analysis is performed using the possible proxy and based on the type of the possible proxy. The network analysis may include any monitoring, comparison, or manipulation of the network traffic directed through or associated with the possible proxy. In one embodiment, the network analysis may include determining a network traffic pattern for network traffic from the possible proxy. The network traffic pattern may include a route for the network traffic (e.g., based on geographic location of the possible proxy, a destination of the request, or a load-balancing pattern), a fraud or abuse usage pattern, or the like.

In one embodiment, a network analysis may involve using the possible proxy to determine whether a particular network address/device is accessible at a geographic proximity (e.g., within the same state, country, or region) to the possible proxy, if the proxy type is an anonymous-proxy or an open-proxy. For example, a network device may not be accessible from a first geographic location (e.g., within China), but may be accessible in a second geographic location (e.g., within U.S.A.). A possible proxy that is determined to be an anonymous-proxy or open-proxy may be used to forward a request between a network device in the first geographic location to a device in the second geographic location to determine if the second device is accessible. A network traffic pattern may then be determined based on the route from the requester to the geographic location of the possible proxy.

In another embodiment, another network analysis may involve using the possible proxy to determine whether a plurality of requests from the possible proxy matches a fraud usage pattern, such as what might occur if the proxy type is an anonymous-proxy. The fraud usage pattern may be a repeated download of a content, a repeatedly click through of a search advertisement, spam, or any network usage pattern.

In another embodiment, another network analysis may include using the possible proxy to determine an accuracy of a routing algorithm for sending a request to a destination (device, webpage, URL, or the like), if the proxy type is an anonymous-proxy or open-proxy. For example, a routing algorithm may determine the geographic origin of a request and may route the request to a particular server, a particular version of a web page on the server, or the like, for further processing. An anonymous-proxy may replace the IP address of the request with the IP address of the anonymous-proxy. The IP address of the anonymous-proxy may be associated with a geographic origin. The response to the request may be determined to be the appropriate response for the geographic origin. The accuracy of the routing algorithm may be based on the appropriate response returned.

A network traffic pattern may also be determined based on the routing of the request from the requestor, through the possible proxy, and to the destination. In general the network traffic pattern may also include other routing patterns, including load-balancing patterns (e.g., whether multiple requests to the same server and through the possible proxy is directed to a different content server for providing a response to the request), or the like. Processing then continues to block 409.

At block 409, a quality of service for a network traffic associated with the possible proxy (e.g., network traffic from and/or to the possible proxy) may be varied based on the determined type of the possible proxy. In one embodiment, if the proxy type is an open-proxy type or an anonymous-proxy type, the quality of service may be provided at a first level. For example, the quality of service may be provided as at least one of a restricted access to content, a restricted network access, a higher latency connection, a limited click-through advertisement campaign, or the like. In another embodiment, network traffic from the possible proxy may be routed to a content server with a higher load and/or less resources than other content servers in a pool of available content servers.

In another embodiment, if the proxy type is an controlled-proxy type or a non-proxy type, the quality of service may be provided at a second level, wherein the second level is a higher level than the first level. For example, the quality of service may be provided as at least one of another access to content with less restrictions than the restricted access, a network access with less restrictions than the restricted network access, a connection with lower latency than the higher latency connection, a click-through advertisement campaign with a higher value-per-click measure than the limited click-through advertisement campaign, or the like. In another embodiment, the network traffic may be routed to a premium content server, a server with more resources, or the like.

In any case, network traffic associated with a controlled-proxy and or/a non-proxy may be given a higher or better quality of service than network traffic associated with an open-proxy and an anonymous-proxy. Thus, in yet another embodiment, network traffic associated with a controlled-proxy and further identified as associated with a preferred customer may be given an even higher or better quality of service than another type of network traffic. For example, the value-per-click for a click on an advertisement in an ad campaign may be associated with more value than a click through associated with network traffic from a controlled proxy that is not identified as a preferred customer. In any case, processing then continues to block 410.

At block 410, a network traffic associated with the possible proxy may be controlled based in part on a result of the network analysis and/or the type of the possible proxy. As indicated by the dotted lines, block 410 is optional and may not be performed. In one embodiment, a network device may be protected from the network traffic based on the result of the network analysis and/or the type of the possible proxy. The network traffic may be controlled by being limited, restricted, filtered, routed, or the like. In one embodiment, network access may be controlled based on, for example, if the type of the possible proxy is an anonymous proxy. In one embodiment, network access may be controlled based on, for example, if the type of the possible proxy is an open-proxy, and the network analysis indicates that the traffic from the possible proxy matches a fraud usage pattern. In another embodiment, network traffic from a controlled proxy may be determined to be trusted based on the network analysis, and the network traffic may be routed to a preferred server (e.g., a server providing more access or content). One of skill in the art will appreciate that any variation of the use of the result of the network analysis and/or the type of the possible proxy may be used to control the network traffic from the possible proxy. Processing then returns to a calling process for further processing.

FIG. 5 illustrates a logical flow diagram generally showing one embodiment of a process for determining a type of a possible proxy. Process 500 may be performed by proxy discoverer 130 and/or content server 122-123 of FIGS. 1 and 2.

Process 500 begins, after a start block, at decision block 502 where it is determined whether the possible proxy provides an open port. A port may be a TCP/IP port, a UDP, port, or the like. The port may be determined to be open based on a port scan, or another method for requesting and/or inspecting networking information received from the possible proxy's port. "Nmap" is one program usable for port scanning of the possible proxy to determine that the port is open or unopened (e.g., closed, filtered, or the like).

In one embodiment, TCP/IP port scanning may involve sending a SYN or FIN packet to the possible proxy and monitoring network traffic from the possible proxy to determine if a SYN-ACK packet is received. In one embodiment, port scanning may also involve: 1) identifying whether the port may be open if the possible proxy sends a reply that the possible proxy is listening on the port; 2) identifying whether the port may be closed, denied, or not listening, if the possible proxy sends a reply indicating that the connection will be denied on the port; 3) identifying whether the port may be filtered, dropped, or blocked if there is no reply from the possible proxy (e.g., within a pre-determined period of time). Port scanning may involve many other methods, as is known in the art.

In one embodiment, port scanning may involve sending a discovery network message (e.g., a SYN packet) to the possible proxy on ports in a list of possible proxy ports. The list of possible proxy ports may be pre-determined and/or dynamically determined.

In another embodiment, all ports of the possible proxy may be scanned for the port, wherein the port is useable as at least one port in the list of possible proxy ports. In other words, the port that is determined to be open may be used in the list of possible proxy ports for future/further port scans.

In any case, if it is determined (discovered) that the possible proxy provides an open port, then processing continues to block 506. If it is determined that the possible proxy does not provide an open port, then processing continues to block 505, where the type of the possible proxy is determined as a non-proxy.

At block 506, a request is sent to a network device through the possible proxy on the open port. The request may be a TCP/IP packet, a UDP/IP packet, or the like. The request may be in the form of an OSI Layer 7, application layer request (e.g., HTTP, SSL, FTP, SMTP, Gopher, SOCKS), or the like. In one embodiment, a program, such as "wget" may be used to send an HTTP and/or FTP request over the port of the possible proxy to the network device. The network address (e.g., IP address) and port of the possible proxy is identified as the proxy server. For example, an environmental variable may be specified: "export http_proxy='http://192.168.10.11:8080'." Next, the command to send the request may invoked. For example, the command invoked may be: "wget http://www.myserver.com:80/special_test_url."

In general, the network address of the network device may be included in the request to be forwarded, in a variety of ways. For example, the network address may be specified in the application layer protocol (e.g., for the HTTP protocol, the URI of the request message may specify the network address). Alternatively, a different protocol such as SOCKS may be used to encapsulate the application layer request, wherein the application layer request includes the network address. One of ordinary skill in the art will appreciate that other methods for sending a request to the network device through the possible proxy on the open port may be used without departing from the scope of the invention.

At decision block 508, it is determined whether a request is received by the network device. In one embodiment, network traffic (e.g., on a particular port), may be monitored on the network device. For example, an HTTP log of a web server on the network device may be monitored for the request. In other embodiments, a network monitoring program may monitor the network traffic for the request. In one embodiment, the request may be identified by the URI, parameters, request method, source address, and/or other identification information associated with the protocol for sending/receiving the request, or the like. For example, the request may be sent to a special URL (e.g., "http://www.myserver.com:80/special_test_url") that identifies whether the request is received by the network device.

In any case, if at least one request is received and the at least one request is identified as the request sent at block 506, then it is determined that the request is received by the network device. A request may not be received for different reasons. In one embodiment, the port may not accept proxy requests (e.g., of a particular type, under particular network conditions, or the like). In another embodiment, the proxy requests may have been dropped, timed-out, or the like. In any case, if a request is received by the network device, then processing continues to block 511. If a request is not received by the network device, then processing continues to decision block 510, where the type of the possible proxy is determined to be a controlled-proxy or a non-proxy.

In an alternate embodiment, block 510 may include determining the proxy type as a controlled-proxy based on the use of another possible proxy device that is determined to be an open and/or anonymous proxy (e.g., using process 500). For example, if the other possible proxy forwards a first request to the network device but the possible proxy fails to forward a second request to the network device, then a determination is made whether the possible proxy is a controlled-proxy. In one embodiment, the other possible proxy may be used to forward a third request through the other possible proxy, through the possible proxy, and to the network device. If the request is received by the network device, it may be determined that a request may be blocked by the possible proxy from one location, but not from another (e.g., from the other possible proxy). It may then be determined that the type of the possible proxy is a controlled-proxy. In any case, processing returns to a calling process for further processing.

At block 511, in one embodiment, all ports on the possible proxy may be analyzed to determine an open port. The determination of open ports may be performed substantially similar to the mechanisms described in decision block 502 (e.g., port scanning). This analysis of all open ports may enable the determination of the identities of new open ports that may not be commonly or typically used as proxy ports for proxy servers. The determined open ports may be used in future processing of, for example, decision block 502 as part of the list of possible proxy ports to determine whether the possible proxy provides an open port. In one embodiment, open ports (e.g., a particular port number) may be determined to be used within a particular time frame and within a frequency distribution. If a particular open port is discovered to occur at a pre-determined rate (e.g., at least five times), within a time window (e.g., a week, day, month, year), then the open port is selected to be part of the list of possible proxy ports. The list of possible proxy ports may then be used at decision block 502 (e.g., in a future invocation of decision block 502). In any case, a feedback loop is created to provide newly discovered proxy ports for future processing of process 500. Processing then continues to decision block 512.

At decision block 512, it is determined whether a request received by the network device obscures or otherwise obfuscates information about an origin of the request. The request may be obscured and/or obfuscated in many ways. In one embodiment, a source address of the request may be specified as the possible proxy's network address, instead of the requestor's network address. In another embodiment, other identifying information may be removed or changed, including cookies, user agents, or the like.

In any case, it is determined whether the original information sent with the request through the possible proxy matches or substantially matches the information received from the possible proxy. Information may substantially match if particular fields, portions, or parts of the information matches (e.g., particular fields of a network header). The matching may be based on, for example, a comparison between the network header information (e.g., network address, cookies, user agents or other characteristics) included with the request sent to the possible proxy and the network header information included with the request received from the possible proxy. If identifying information have been removed and/or otherwise changed, then it is determined that the request obscures or obfuscates information about an origin of the request.

If the request obscures and/or otherwise obfuscates the information about the origin, then processing continues to block 514, where the type of the possible proxy is determined as an anonymous-proxy. From block 514, processing continues to block 516.

If the request does not obscure the information, then processing continues to block 516, where the type of the possible proxy is determined as an open-proxy. Processing then returns to a calling process for further processing. The calling process, may, for example, make use of the type of the possible proxy to perform the operations of blocks 406, 408, and/or 410 of FIG. 4.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method operating on a proxy discoverer network device for determining network information, comprising:
   determining a network address to a network device that is a possible proxy device;
   if the possible proxy provides an open port:
   sending over the open port, a request towards a network device through the possible proxy device;
   monitoring a behavior of the other network device to the request;
   determining, based on the monitored behavior, a proxy type of the possible proxy device, wherein:

determining the proxy type as a controlled-proxy or a non-proxy if the request fails to be received by the network device;
determining the proxy type as an open-proxy if the request is received by the network device; and
determining the proxy type as an anonymous-proxy based on a comparison between network header information included with the sent request and a network header information included with the received request; and
varying a quality of service for a network traffic from the possible proxy device based on the proxy type, wherein varying the quality of service further comprises:
if the proxy type is an open-proxy type or an anonymous-proxy type, providing the quality of service at a first level; and
if the proxy type is an controlled-proxy type or a non-proxy type, providing the quality of service at a second level, wherein the second level is a higher level than the first level; and
if the possible proxy does not provide an open port, indicating that the possible proxy is a non-proxy.

2. The method of claim 1, further comprising:
protecting a network device from network traffic from the possible proxy device based on the proxy type by controlling the network traffic associated with the possible proxy based on the proxy type.

3. The method of claim 1, further comprising:
determining whether the possible proxy provides the open port based on whether the open port enables an HyperText Transfer Protocol (HTTP) proxy operation.

4. A network device for determining network information, comprising: a transceiver to send and receive data over the network; and
a processor that is operative to perform actions, comprising:
identifying another network device as a possible proxy based on a network activity associated with the other network device;
determining a type of the possible proxy based on whether the possible proxy provides a port to accept an HyperText Transfer Protocol (HTTP) proxy operation, and based on a characteristic of a request forwarded by the possible proxy over the port, wherein the type of the possible proxy includes a controlled-proxy, an open-proxy, or an anonymous-proxy;
performing a network analysis using the possible proxy and based on the type of the possible proxy; and
providing a result of the network analysis, the result useable for varying a quality of service for a network traffic from the possible proxy.

5. The network device of claim 4, wherein the network analysis includes determining at least one of: a network metric,
an accessibility of at least one network device connected to the possible proxy, or an abusive network behavior associated with the possible proxy.

6. The network device of claim 4, wherein determining the type of the possible proxy further comprises: sending a request directed to a destination device through the possible proxy over the port; and
determining, after sending the request, the proxy type associated with the possible proxy based in part on:
whether the port is unable to accept the HTTP proxy operation,
whether the request is received by the destination device, or
whether a network header information included with the request received by the destination device obscures identifying information of a requestor of the request.

7. The network device of claim 4, wherein the actions further comprises: sending a request to the possible proxy over the port for forwarding to a destination device;
if the request is received by the destination device:
scanning all ports of the possible proxy for an open port;
providing the open port for use in the step of determining the type of the possible proxy, if the open port is discovered to occur at a pre-determined rate within a time window.

8. The network device of claim 4, wherein the actions further comprises: using the possible proxy to determine whether another network address is accessible at a geographic proximity to the possible proxy, if the proxy type is an anonymous-proxy or an open-proxy.

9. The network device of claim 4, wherein the actions further comprises: using the possible proxy to determine whether a plurality of requests from the possible proxy matches a fraud usage pattern, if the proxy type is an anonymous-proxy.

10. The network device of claim 4, wherein the actions further comprises: using the possible proxy to determine an accuracy of a routing algorithm for sending a request to a destination, if the proxy type is an anonymous-proxy or open-proxy.

11. A system for determining network information, comprising: a proxy discovery manager within a network device that performs actions comprising:
identifying a network device as a possible proxy;
discovering a port that is open on the possible proxy;
sending a request through the possible proxy over the port towards a network address associated with a request receiver;
determining a proxy type associated with the possible proxy based in part on information received from the request receiver the proxy type including one of an anonymous-proxy, a closed-proxy, a controlled-proxy, or an open-proxy;
restricting network access from the possible proxy based on the determined proxy type by varying a quality of service from the possible proxy device based on the determined proxy type; and
the request receiver being configured to perform actions comprising:
determining the information based on whether the request is received at the network address and on a characteristic of at least one received request received from the possible proxy.

12. The system of claim 11, wherein discovering the port that is open on the possible proxy further comprises: determining whether the possible proxy and the port enable an HyperText Transfer Protocol (HTTP) proxy operation.

13. The system of claim 11, wherein determining a proxy type associated with the possible proxy based in part on the information from the request receiver further comprises:
determining the proxy type as a controlled-proxy or a non-proxy if the request fails to be received by a network device associated with the network address;
determining the proxy type as an open-proxy if the request is received by the network device; and
determining the proxy type as an anonymous-proxy based on whether a network header information included with the received request obscures an origin of the request.

14. The system of claim 11, wherein the proxy discovery manager performs actions comprising: determining the proxy type as a non-proxy if the port is unopened.

15. The system of claim 11, wherein identifying a network device as a possible proxy further comprises determining whether a network traffic history from the network device matches a network traffic pattern.

16. A processor readable storage medium having processor executable instructions for determining network information, the processor executable instructions that enables a processor to perform actions, comprising:
- determining whether a proxy provides a port configured to enable a first request, the first request being an Open Systems Interconnection (OSI) Layer 7 proxy request;
- sending a first request to the possible proxy over the port for forwarding to a network device;
- determining a proxy type associated with the possible proxy based in part on monitoring a network behavior of the network device for the request, the proxy type including one of a controlled-proxy, an open-proxy, a closed-proxy, or an anonymous-proxy; and
- varying a quality of service to a network traffic from the possible proxy device based on the proxy type.

17. The processor-readable storage medium of claim 16, wherein the actions further comprises: determining whether the possible proxy forwards the first request to the network device;
- based on the determination that the possible proxy forwards the first request to the network device:
- determining that another possible proxy fails to forward a second request from a requestor to the network device;
- using the possible proxy to forward a third request from the requestor, through the other possible proxy, and to the network device; and
- determining another proxy type of the other possible proxy as a controlled-proxy if the other possible proxy forwards the third request to the network device.

18. The processor-readable storage medium of claim 16, wherein the actions further comprises: controlling network traffic associated with the possible proxy based on the proxy type.

* * * * *